G. F. DICKSON.
BRINE COOLING APPARATUS.
APPLICATION FILED FEB. 1, 1907.
931,687.
Patented Aug. 17, 1909.
2 SHEETS—SHEET 1.
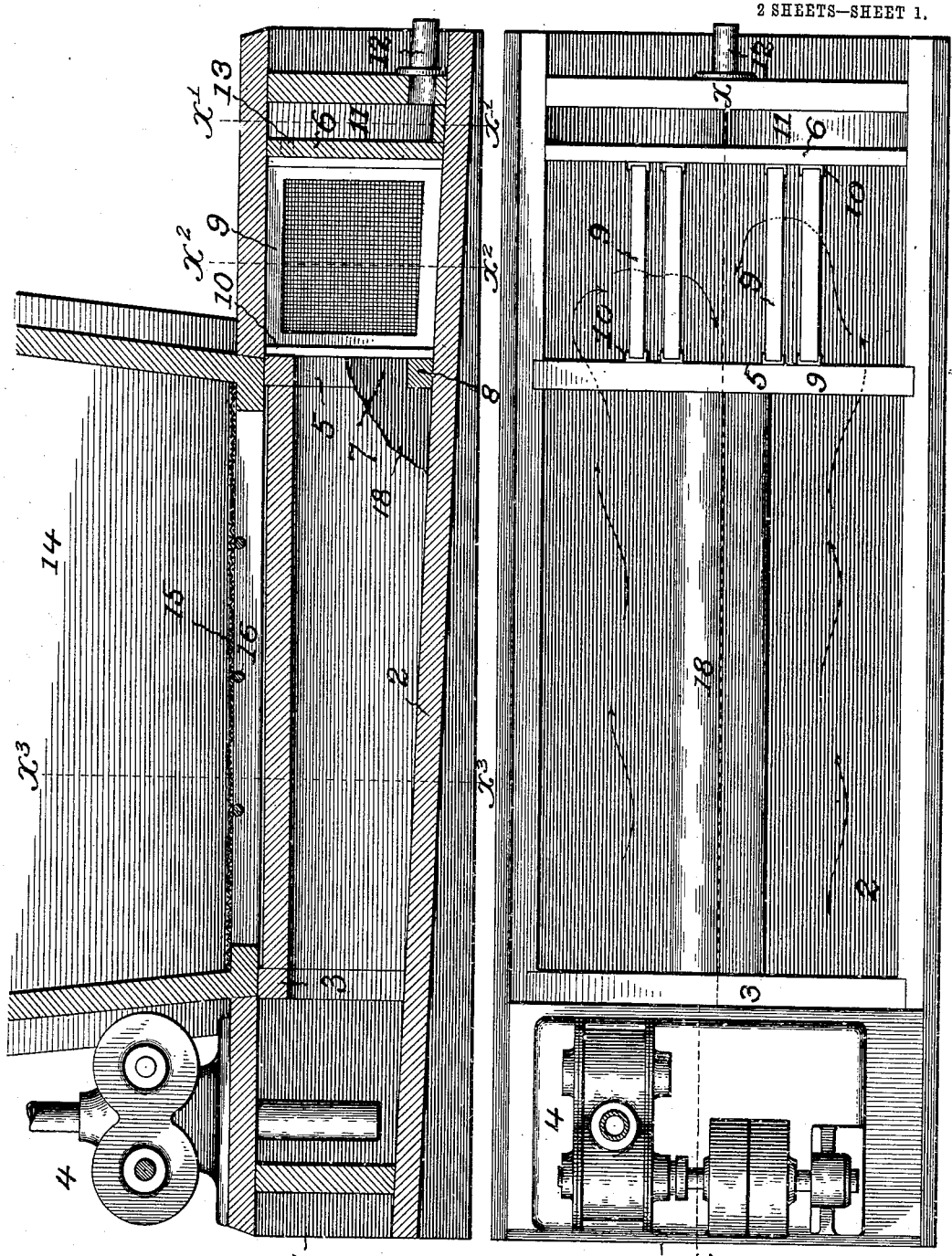
Attest:
John Enders
Henry Mor
Inventor:
George F. Dickson,
by Robert Burns
Attorney

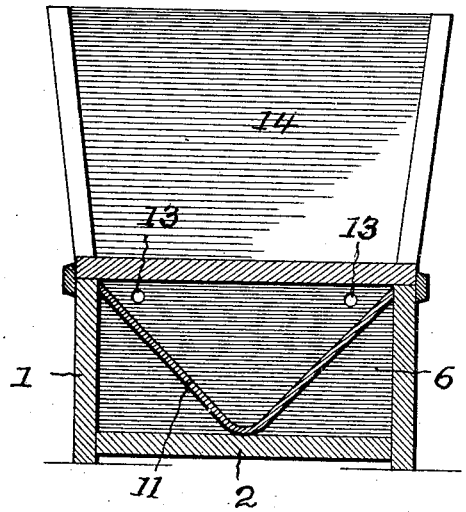
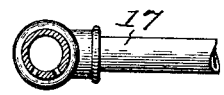
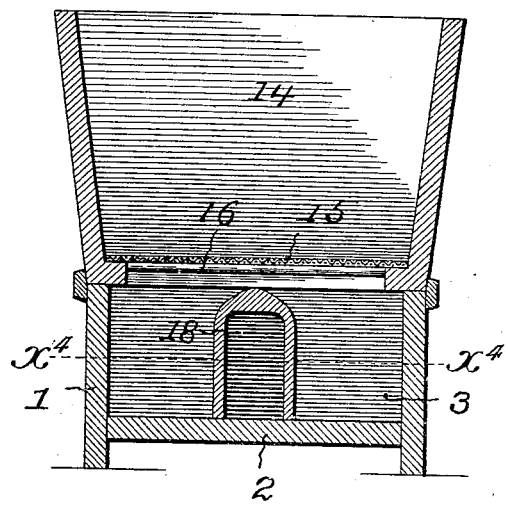
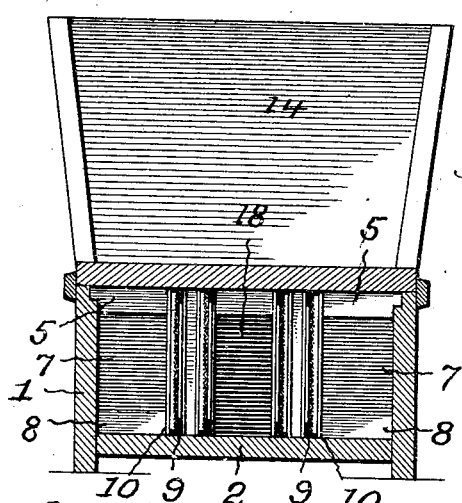
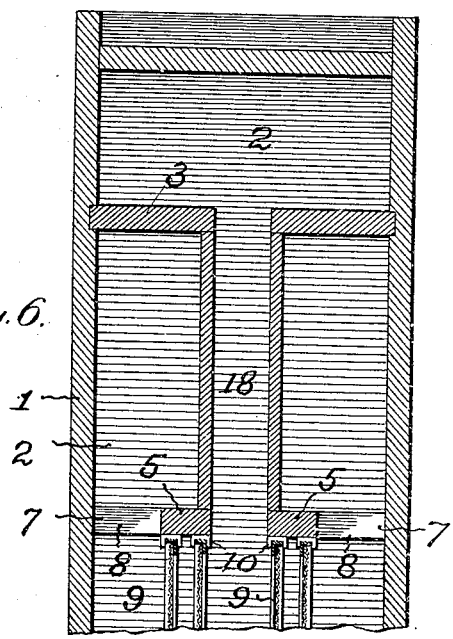

UNITED STATES PATENT OFFICE.

GEORGE F. DICKSON, OF CHICAGO, ILLINOIS, ASSIGNOR TO CONFECTIONERS AND BAKERS SUPPLY CO., A CORPORATION OF ILLINOIS.

BRINE-COOLING APPARATUS.

No. 931,687.     Specification of Letters Patent.     Patented Aug. 17, 1909.

Application filed February 1, 1907. Serial No. 355,281.

*To all whom it may concern:*

Be it known that I, GEORGE F. DICKSON, a citizen of the United States of America, and a resident of Chicago, in the county of Cook and State of Illinois, have invented certain new and useful Improvements in Brine-Cooling Apparatus, of which the following is a specification.

This invention relates to that type of brine cooling apparatus used in connection with ice-cream freezers and the like, and in which the brine has a continued circulation through the freezing jacket or chamber of an ice-cream freezer and through the brine cooling apparatus, and in its passage to the latter is sprayed upon a mass of salt and ice to acquire a reduced temperature; and the present improvement has for its object to provide a simple and efficient structural formation and combination of parts whereby the brine after passing through the supply of ice and salt is very effectively screened from impurities, solid particles of ice, etc., before it returns to the freezing chamber, and with which the slime and floating impurities are removed in a ready and effective manner, all as will hereinafter more fully appear.

In the accompanying drawings:—Figure 1, is a longitudinal section on line $x$—$x$ Fig. 2. Fig. 2, is a plan view with the hopper removed. Fig. 3, is a transverse section, on line $x'$—$x'$, Fig. 1. Fig. 4, is a similar view on line $x^2$—$x^2$, Fig. 1. Fig. 5 is a similar view on line $x^3$—$x^3$, Fig. 1. Fig. 6, is a detail horizontal plan on line $x^4$—$x^4$ Fig. 5.

Similar numerals of reference indicate like parts in the several views.

Referring to the drawings, 1 represents the main housing or casing of the apparatus, of an elongated rectangular form, and provided with a slanting bottom extending from end to end as shown.

3, is a transverse partition forming in connection with one of the end heads of the casing 1, a pit chamber for the suction pipe of the circulating pump 4 of the apparatus, and which pump is mounted on the cover board of said chamber, as shown.

5, is a transverse partition forming in connection with the partition 3, a brine receiving chamber, at the top of which is arranged the ice and salt containing chamber hereinafter described.

6, is a transverse partition forming in connection with the partition 5, a screen containing chamber, and in connection with the other end head of the main casing 1, a collecting chamber for the floating impurities of the brine.

7, are passages formed in the partition 5, near its outer ends, and which afford communication between the brine receiving chamber and the outer or sub-chambers of the screen containing chamber, as shown in Figs. 1, 4 and 6.

8, is a transverse bar or dam at the bottom of the passages 7 aforesaid, to prevent the passage of solid particles of salt and the like from the brine receiving chamber into the screen containing chamber.

9, are counterpart series of screens arranged longitudinally in screen containing chamber, and located at opposite sides of the central line of the apparatus, as shown in Figs. 2, 4 and 6, to divide the said chamber into two outer sub-chambers having communication with the passages 7 aforesaid, and a central sub-chamber having communication with the longitudinal duct hereinafter described, and by which the brine is conducted to the pit chamber of the pump. The screens will usually consist of a marginal frame and a center of wire fabric, and will be held in a vertical position by the vertical guide pieces 10, secured to the transverse partitions 5 and 6, as shown.

The collecting chamber aforesaid is preferably of the hopper form shown, and formed by the angularly formed transverse partition 11, as illustrated in Fig. 3.

12, is an outlet duct or waste pipe connecting with the lower part of the collection chamber aforesaid.

13, are communicating passages between the screen containing and collection chambers aforesaid, and formed in the partition 5, near its upper end.

14, is a hopper arranged above the brine receiving chamber aforesaid, and provided with a perforated bottom preferably formed by a wire screen 15, and transverse screen supporting rods 16, as shown in Figs. 1 and 5. Such hopper is adapted to contain a filling of broken ice and salt, upon which the brine as it returns from the freezing chamber or jacket of an ice-cream freezer or the like is discharged in a series of small streams from the perforated discharge head or pipe 17, arranged centrally and longitudinally above the hopper as shown.

18, is a longitudinal duct, the casing of which extends from the partition 3 to the partition 5 and is arranged centrally in the brine receiving chamber aforesaid. Said duct at one end opens into the central sub-chamber of the screen containing chamber aforesaid, and at the other end into the pit chamber of the circulating pump, as shown in Figs. 1, 2, 4, 5 and 6.

In the preferred form of the present invention the various partitions, covers, screen members and hopper are made removable with a view to afford ready access to the parts in cleaning the same, and to permit of the ready removal of a defective part and the substitution therefor of a like perfect part.

In the operation of the apparatus, the brine returning from the freezing chamber or jacket of an ice-cream freezer or the like is sprayed over the mass of ice and salt in the hopper 14, and in trickling down through the same acquires the necessary reduced temperature. Passing down through said hopper, the brine enters the brine receiving chamber at the sides of the casing of the longitudinal duct 18, in an evenly divided manner, and flows therefrom into the outer sub-chambers of the screen containing chamber, thence through the series of screens 9 into the central sub-chamber of the screen containing chamber, and thence back through the longitudinal duct 18 into the pit chamber of the circulating pump 4 to be returned to the freezing chamber or jacket of an ice-cream freezer or the like.

In its passage through the longitudinal duct 18, the brine acquires a reduced temperature from the surrounding brine in the brine receiving chamber, to compensate for any loss in the passage through the screen containing chamber.

The flow of the brine through the apparatus will ordinarily be so slow as not to interfere with the passage of the scum and lighter impurities from the screen containing chambers into the collecting chamber through passages 13.

Having thus fully described my said invention what I claim as new and desire to secure by Letters Patent, is:—

1. In a brine cooling apparatus, the combination of an ice hopper, a brine chamber arranged beneath the same, a screen containing chamber arranged at one end of the brine chamber, a pump chamber arranged at the other end of the brine chamber, and a longitudinal duct passing through the brine chamber and connecting the screen containing chamber with the pump chamber, substantially as set forth.

2. In a brine cooling apparatus, the combination of an ice hopper, a brine chamber arranged beneath the same, a screen containing chamber arranged at one end of the brine chamber, a pump chamber arranged at the other end of the brine chamber, and a longitudinal duct connecting the screen containing chamber with the pump chamber, and arranged centrally in the brine chamber, substantially as set forth.

3. In a brine cooling apparatus, the combination of an ice hopper, a brine chamber arranged beneath the same, a screen containing chamber arranged at one end of the brine chamber, a pump chamber arranged at the other end of the brine chamber, a longitudinal duct connecting the screen containing chamber with the pump chamber and arranged centrally in the brine chamber, and a series of screens arranged in the screen containing chamber at opposite sides of the longitudinal duct, substantially as set forth.

4. In a brine cooling apparatus, the combination of an ice hopper, a brine chamber arranged beneath the same, a screen containing chamber arranged at one end of the brine chamber, a pump chamber arranged at the other end of the brine chamber, a longitudinal duct connecting the screen containing chamber with the pump chamber and a collecting chamber arranged at the end of the screen containing chamber and communicating therewith near its top, substantially as set forth.

5. In a brine cooling apparatus, the combination of an ice hopper, a brine chamber arranged beneath the same, a screen containing chamber arranged at one end of the brine chamber, a pump chamber arranged at the other end of the brine chamber, a longitudinal duct connecting the screen containing chamber with the pump chamber and a collecting chamber having a hopper form and arranged at one end of the screen containing chamber and communicating therewith near its top, substantially as set forth.

6. In a brine cooling apparatus, the combination of a centrally located ice hopper, a brine chamber extending horizontally beneath the same, a pump chamber arranged at one end of the brine chamber, and a longitudinal duct passing horizontally through the brine chamber and connecting a remote end of the same with the pump chamber, substantially as set forth.

Signed at Chicago, Illinois, this 30th day of January, 1907.

GEORGE F. DICKSON.

Witnesses:
ROBERT BURNS,
HENRY MOE.